US006799181B2

(12) United States Patent
Vishnubhotla

(10) Patent No.: US 6,799,181 B2
(45) Date of Patent: Sep. 28, 2004

(54) METHOD AND SYSTEM FOR DATA MINING AUTOMATION IN DOMAIN-SPECIFIC ANALYTIC APPLICATIONS

(75) Inventor: Prasad R. Vishnubhotla, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/600,636

(22) Filed: Jun. 20, 2003

(65) Prior Publication Data

US 2004/0010505 A1 Jan. 15, 2004

Related U.S. Application Data

(63) Continuation of application No. 09/843,066, filed on Apr. 26, 2001, now Pat. No. 6,636,860.

(51) Int. Cl.[7] ........................... G06F 17/30; G06F 15/18
(52) U.S. Cl. ............................... 707/100; 707/1; 706/21
(58) Field of Search ................................ 707/100, 101, 707/1, 2, 3, 5, 6, 10, 15, 104; 706/21, 14, 15, 16

(56) References Cited

U.S. PATENT DOCUMENTS

| | | | | |
|---|---|---|---|---|
| 5,970,482 A | * | 10/1999 | Pham et al. | 706/16 |
| 6,081,788 A | * | 6/2000 | Appleman et al. | 705/14 |
| 6,157,926 A | * | 12/2000 | Appleman et al. | 707/102 |
| 6,542,894 B1 | * | 4/2003 | Lee et al. | 707/101 |
| 6,629,095 B1 | * | 9/2003 | Wagstaff et al. | 707/5 |
| 6,687,693 B2 | * | 2/2004 | Cereghini et al. | 707/6 |
| 6,704,717 B1 | * | 3/2004 | Tate | 706/15 |
| 6,718,338 B2 | * | 4/2004 | Vishnubhotla | 707/102 |

* cited by examiner

Primary Examiner—Sanjiv Shah
(74) Attorney, Agent, or Firm—John R. Biggers; Mark S. Walker; Biggers & Ohanian, LL

(57) ABSTRACT

Automated data mining using domain-specific analytic applications for solving predefined problems, including populating input data schema, the input data schema having a format appropriate to solution of a predefined problem. Production training a predefined data mining model to produce a trained data mining model, the predefined data mining model comprising a predefined data mining model definition, production training having an output of a knowledge base. Executing a preselected data mining algorithm in production training mode. Production scoring input data from the input data schema. The method typically includes scheduling the steps of populating input data schema, production training, and production scoring. Typically the analytic application includes predefined problems, predefined data mining algorithms, predefined data schema, and at least one predefined data mining model definition.

69 Claims, 5 Drawing Sheets

| Data Element Name | Data Element Meaning or Usage |
|---|---|
| shopper_id | Unique identifier for the shopper — 202 |
| income | Shopper's income rounded to the closest $5000 — 204 |
| age | Shopper's age rounded to the closest multiple of 5 — 206 |
| gender | Shopper's gender (M or F) — 208 |
| household | Number of household members — 210 |
| sales_revenue | Sales revenue contributed by the shopper to the closest $100 — 212 |

| Parameter Purpose | Parameter Name | Parameter Example Value | |
|---|---|---|---|
| Settings | Name | Shopper settings | 302 |
| | Mining function | Prediction - Radial Basis Function | 304 |
| Input data | Input data | Shopper data | 306 |
| | Optimized mining run for | Time | 308 |
| Mode parameters | Use mode | Training mode | 310 |
| | In-sample size | 2 | 312 |
| | Out-sample size | 1 | 314 |
| | Maximum number of passes | 4 | 316 |
| | Maximum centers | 10 | 318 |
| | Minimum region size | 5 | 320 |
| | Minimum passes | 2 | 322 |
| Input fields | Active fields | income, age, gender | 324 |
| | Supplementary fields | household | 326 |
| | Prediction field | sales_revenue | 328 |
| Quantiles | Generate quantiles | No | 330 |
| Output fields | Output fields | shopper_id | 332 |
| | Predicted value field name | Predicted sales_revenue | 334 |
| Output data | Output data | Output sales_revenue | 336 |
| Results | Results name | Prediction model for sales_revenue | 338 |
| | If a result with this name exists, overwrite it | True | 340 |

FIG. 3

| shopper_id | income | age | gender | household | sales_revenue |
|---|---|---|---|---|---|
| 10,001 | 50,000 | 35 | M | 3 | 2,500 |
| 10,002 | 35,000 | 30 | F | 2 | 1,000 |
| 10,003 | 95,000 | 50 | M | 4 | 5,000 |
| 10,004 | 25,000 | 25 | M | 1 | 0 |
| 10,005 | 75,000 | 40 | F | 4 | 3,300 |
| 10,006 | 30,000 | 30 | F | 2 | 1,200 |
| 10,007 | 45,000 | 35 | M | 3 | 2,400 |
| 10,008 | 90,000 | 50 | M | 4 | 4,500 |
| 10,009 | 70,000 | 40 | F | 4 | 3,000 |
| 10,010 | 60,000 | 60 | F | 3 | 1,500 |

METHOD AND SYSTEM FOR DATA MINING AUTOMATION IN DOMAIN-SPECIFIC ANALYTIC APPLICATIONS

CROSS-REFERENCE TO RELATED APPLICATION

This application is a continuation application of and claims priority from U.S. patent application Ser. No. 09/843,066, filed on Apr. 26, 2001 now U.S. Pat. No. 6,636,860.

BACKGROUND OF THE INVENTION

1. Field of the Invention

The field of the invention is data processing, that is, methods and systems for financial, business practice, business management, or cost/price determinations.

2. Description of the Related Art

A data mining tool is computer software that analyzes data and discovers relationships, patterns, knowledge, or information from the data. Data mining is also referred to as knowledge discovery. Data mining tools attempt to solve the problem of users being overwhelmed by the volume of data collected by computers operating business applications generally and including particularly those for e-commerce. Data mining tools attempt to shield users from the unwieldy body of data by analyzing it, summarizing it, or drawing conclusions from the data that the user can understand. For example, one known computer software data mining product is IBM's "Intelligent Miner" which is operable in several computing environments including AIX, AS/400, OS/390, Windows NT, and Windows 2000, and Solaris. The IBM Intelligent Miner is an enterprise data mining tool, designed for client/server configurations and optimized to mine very large data sets, such as gigabyte data sets. The IBM Intelligent Miner includes a plurality of data mining techniques or tools, used to analyze large databases and provides visualization tools used to view and interpret the different mining results.

An analytic application is a software application that inputs historical data collected from a production system over time, analyzes this historical data, or samples of the historical data, and outputs the findings back to the production system to help improve its operation. For example, an e-commerce server that manages an internet shopping site is a production system, and an analytic application might use historical data collected from the e-commerce server to report on what type users are visiting the site and how many of these are actually buying products. The term "analytic application" is used throughout this specification to mean "analytic software application," referring to a category of software typically understood to be used directly by end users to solve practical problems in their work.

Data mining is an important technology to be integrated into analytic applications. Data mining is data processing technology, combinations of hardware and software, that dynamically discover patterns in historical data records and applies properties associated with these records (e.g., likely to buy) to production data records that exhibit similar patterns. Use of data mining typically involves steps such as identifying a business problem to be solved, selecting a mining algorithm useful to solve the business problem, defining data schema to be used as inputs and outputs to and from the mining algorithm, defining data mining models based upon the defined data schema, populating input data schema with historical data, training the data mining model based upon the historical data, and scoring historical data or production data by use of the model.

Analytic applications typically function in a general cycle in which historical data is collected from a production system over time, historical data, or samples of historical data, are analyzed, and findings are output back to the production system to help improve its operation. The quantities of data to be analyzed are large, and the computational demand is intense. The whole cycle is often executed at regular intervals, for example, once daily at night so that reports showing the analytic findings are available for review the next morning. There is an increasing demand, however, to do the analysis faster and more frequently so that the results on business performance are reported back within as little as a few hours, in some cases, as little as two or three hours, or even, less. In fact, it appears that there is a trend in this area of technology to press for near real-time analytic reporting.

In prior art, however, with available data mining tools, the end user of an analytic application must be sufficiently skilled in data mining to accomplish all the tasks of data mining, some of which require substantial expertise in data mining. For applications such as e-commerce, which are being widely adopted by businesses of all sizes and in all commerce areas, it is difficult and expensive for every business using data mining to acquire substantial data mining expertise. It would be desirable and useful, therefore, for analytic applications to automate data mining so as to reduce the need for end users to have special expertise in data mining as such.

Until recently, it was impossible to automate the data mining cycle because the steps of identifying a business problem to be solved, selecting a mining algorithm useful to solve the business problem, defining data schema to be used as inputs for mining algorithms, and defining data mining models based upon the defined data schema required substantial expertise and individual human judgment brought to bear at an end user's location on an ad hoc, case-by-case basis. Recently, however, predefined data mining models have become available founded on previously identified business questions and associated data schema. In analytic applications operating predefined data mining models, a set of business questions that are useful to end users are predefined and the data schema needed to answer these business questions are also predefined. The predefined data mining models for use in this technology are tested and shipped with a product, an analytic application, which is then production trained and applied automatically by end users without needing specialized data mining expertise.

A data mining model is usually defined to address a given business question based on a given data schema. Data mining tools such as IBM's "Intelligent Miner" are generic applications that are operated independently with respect to specific applications. Because such data mining tools in prior art did not include set business questions, predefined data schema, or predefined data mining models, end users would themselves need to analyze business questions, define data schema useful with respect to the questions, and define their own data mining models based upon the data schema. Developers of analytic applications incorporating data mining tools did not in prior art supply predefined data mining models. Without predefined data mining models, the data mining analytic cycle could not be automated.

Accordingly, in analytic applications using data mining tools, there is significant benefit in predefining data mining models whenever possible, as this will enable developers of analytic applications to develop analytic applications capable of automating data mining cycles so that end users may train and apply predefined data mining models with no need for specialized data mining expertise and with no need for end user intervention in data mining processes as such.

It is also true that in prior art, the often cyclic steps of populating data mining schema with historical data, training a data mining model by use of historical data, and scoring historical data or production data by use of the trained data mining model were steps requiring manual intervention. As a practical matter, manual intervention risks delays and missed schedules. There is a need in the art, therefore, for improved methods of data mining.

SUMMARY OF THE INVENTION

A principal aspect of the present invention is a method of automated data mining using a domain-specific analytic application for solving predefined business problems. Embodiments typically include populating input data schema, wherein said populating comprises reading input data from a data store and writing the input data to input data schema, the input data schema having a format appropriate to solution of a predefined business problem. Embodiment typically include production training a predefined data mining model to produce a trained data mining model, the predefined data mining model comprising a predefined data mining model definition.

Production training typically has as an input the input data stored in the input data schema, and an output comprising a knowledge base. Production training typically includes executing a preselected data mining algorithm in production training mode. Executing the data mining algorithm in production training mode typically includes executing a software process within the analytic application. The trained data mining model generally includes the predefined data mining model definition and the knowledge base.

Typical embodiments include production scoring input data from the input data schema. Production scoring in typical embodiments includes applying the trained data mining model by executing the data mining algorithm in production scoring mode, wherein the data mining algorithm executed in production scoring mode comprises a software process within the analytic application. Executing the data mining algorithm typically has an output comprising production scored data.

Embodiments of the present invention generally include scheduling the steps of populating input data schema, production training, and production scoring, scheduling further comprising storing in computer memory a schedule. Embodiments typically include executing the steps of populating input data schema, production training, and production scoring, said executing further comprising operating a scheduler in dependence upon the schedule.

Analytic applications typically include the predefined business problems to be solved, wherein the predefined business problems typically have referents defined in a specific computational domain. Analytic applications typically include predefined data mining algorithms capable of using input data read from predefined input data schema for solving the predefined business problems. Analytic applications typically include predefined data schema appropriate for solution of the predefined business problems, the predefined data schema further comprising the input data schema and output data schema. Analytic applications typically include at least one predefined data mining model definition, the predefined data mining model definition is dependent upon the predefined data schema.

Aspects of the present invention include methods, systems, and products in which important elements of data mining are automated within an analytic application. In analytic application embodying the present invention, elements of data mining requiring specialized expertise in data mining, such as identifying a business problem to be solved, selecting a mining algorithm useful to solve the business problem, defining data schema to be used as inputs and outputs to and from the mining algorithm, and predefining data mining models, are performed by an analytic application developer. In typical embodiments of the invention, the analytic application developer identifies a set of important business problems capable of definition sufficient to support data mining solutions. The analytic application developer then selects data mining algorithms useful for solving the identified problems and defines data schema useful as inputs to the selected mining algorithms. The analytic application developer also predefines data mining models based upon the defined data schema. Because the business problems, the data schema, the data mining algorithms, and the data mining models are selected and defined prior to involvement by any end user, the business problems, data schema, mining algorithms, and data mining models are referred to in this specification as being 'preselected' and 'predefined.'

In typical embodiments of the present invention, the data mining steps of populating data schema with historical data, training a data mining model based upon the historical data, and scoring historical data or production data by use of the data mining model are carried out under automation. It is possible to carry out these steps under automation because the steps requiring intervention of human developers with special expertise, defining business problems, preselecting mining algorithms, predefining data schema, and predefining data mining models, are performed by an analytic application developer before the end user acquires the analytic application. The end user need only perform straightforward steps to install and start such an analytic application guided by such routine graphical user interface elements as mouse-clickable buttons, pull down menus, and wizards. The overall effect of the inventive method is to substantially eliminate any need for data mining expertise on the part of the end user and greatly reduce the risk of delays or missed schedules in analytic applications operations.

There are several advantages to the present inventive method. When predefined data mining models are available to end users, end users make use of their regular information technology staff to train and apply these data mining models merely by creating automated schedules, such as Unix cron table entries, with no need to train staff in mining technology and mining tools. A more specific example: the end user's systems operations staff need not even know the names and locations of data stores operating as inputs and outputs to and from the data mining tools. These reductions in the demands placed upon end users' operations staff results in significant cost-saving to end users.

An additional benefit of the present invention is that a product vendor, by use of the method of the present invention, builds an e-commerce analytic application in the vendor's development shop, including capabilities of full automation for the steps that must be performed at the end user's installation. As a result, the vendor ships several data mining models ready to be used by end users straight out of the box, requiring no expertise in data mining on the part of the end user's staff. This adds significant value to the vendor's product, partly because it adds functionality to the vendor's product, but also because it reduces end users' costs.

A still further benefit of the present invention is that third-party vendors use the method of the invention to add additional data mining models to an already available analytic product. Use of the present invention increases the demand for such third-party products because adding a new model will cause no corresponding increase in end users' staff work. In some embodiments, for example, adding new data mining models is accomplished entirely on-line, through networked downloads for example, in a fashion that is completely transparent to the end user. In addition, consultants will use the inventive method to define and add new data mining models at an end user site or to the analytic product itself at a development site.

The foregoing and other objects, features and advantages of the invention will be apparent from the following more particular description of an example embodiment of the invention, as illustrated in the accompanying drawings wherein like reference numbers represent like parts of the invention.

BRIEF DESCRIPTION OF THE DRAWINGS

FIG. 2 is an example data schema for an exemplary embodiment.

FIG. 3 is an example of a data mining model definition.

DETAILED DESCRIPTION OF ALTERNATIVE EMBODIMENTS

Figure 1:
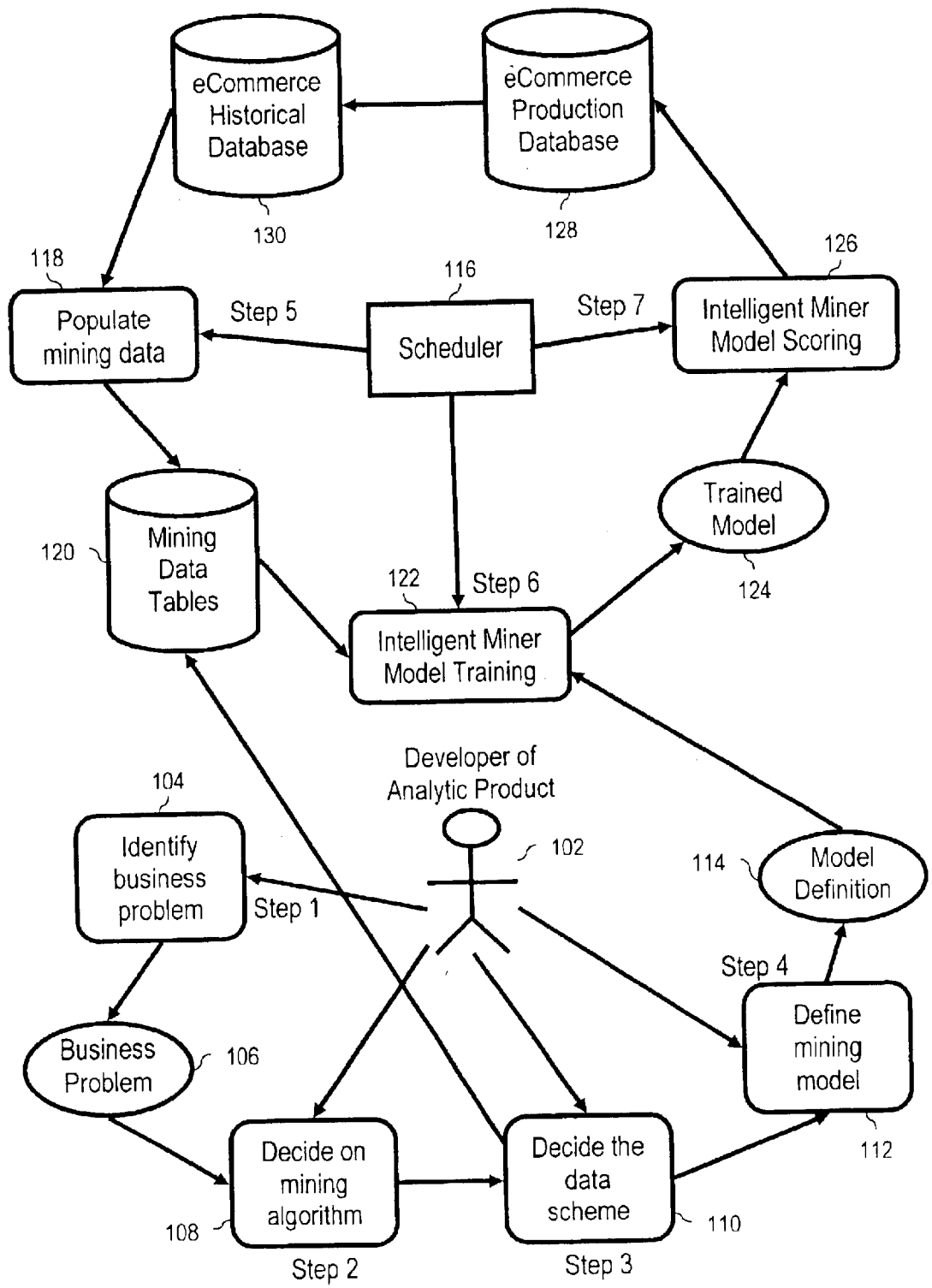
FIG. 1 is a process flow diagram for a method of automating data mining.

The present invention is described primarily in terms of a method for automating the use of data mining in domain-specific analytic applications incorporating predefined data mining models. Persons skilled in the art, however, will recognize that any computer system that includes suitable programming means for operating in accordance with the disclosed method also falls well within the scope of the present invention.

Suitable programming means include any means for directing a computer system to execute the steps of the method of the invention, including for example, systems comprised of processing units coupled to computer memory, which systems have the capability of storing in computer memory programmed steps of the method of the invention for execution by a processing unit. The invention also may be embodied in a computer program product, such as a diskette, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product.

The term "model" is used throughout this specification to refer to data mining models. The terms "model" and "mining model" both refer to data mining models. In typical embodiments of the present invention, a predefined data mining model, not yet production-trained, comprises a data mining model definition. In typical embodiments, a production-trained data mining model comprises a data mining model definition and a knowledge base.

"Data schema" are data structures, defined aggregates of data elements. In this specification, the term "data schema" is used to refer both to schema and to data stores, files, or records fashioned in dependence upon the schema. The terms "field" and "data element" are used as synonyms. Because of the convention of viewing records and fields in a file as though they were respectively rows and columns on a chart, fields and data elements are sometimes referred to as "columns." The term "record" is used to refer to specific instances of data schema. In this sense, as the terms typically are used, data stores or databases are comprised of data files which in turn are comprised of records which in turn are comprised of data elements or fields.

A useful key to simplifying the use of data mining in analytic applications is to make the analytic application domain-specific. "Domain" refers to a problem subject area, and "domain-specific" means that an analytic application is designed to operate on the basis of data related to a particular problem subject area, where the data has specific defined data elements with defined relations among the data elements. For example, e-commerce is a specific domain, and a domain-specific analytic application for e-commerce would accept and analyze only e-commerce data. For illustration purposes in this specification, e-commerce is chosen as the domain of interest.

For a specific domain, it is a typical use of embodiments of the present invention to identify business problems that are applicable to such a specific domain. Once the business problems that need data mining are identified, embodiments of the invention then typically are used to build an analytic application to solve these business problems so that the analytic application developer is able to embed in the analytic application all data mining related knowledge needed for the solution so that the end user of the application does not require data mining specific expertise.

How this is to be done is illustrated in this specification by disclosing the steps of the inventive method as used to solve business problems. The process flow involved in these steps is described by the diagram given in FIG. 1. In typical embodiments, as mentioned above, the steps of defining business problems, preselecting mining algorithms, predefining data schema, and predefining data mining models, are done by the analytic application developer, whereas the steps of populating the data schema with historical data, training the model, and scoring historical data or production data are performed under automation at the end user's installation.

Embodiments of the present invention include methods and systems in which elements of data mining, such as identifying a business problem to be solved, selecting a mining algorithm useful to solve the business problem, defining data schema to be used as inputs and outputs to and from the mining algorithm, and defining data mining models based upon the data schema are performed by an analytic application developer. An "analytic application developer" is a software developer that develops analytic software applications. Throughout this specification, the analytic application developer is described in contrast to the end user. An "end user" is a person or entity that installs and uses analytic applications for purposes of business data analysis. Analytic application developers create the analytic applications that end users use.

In this specification, the terms "input data," "input schema," "output data," and "output schema" refer to inputs and outputs to and from data mining algorithms in data mining models. Naturally there are processes having inputs and outputs other than data mining algorithms. Data output from historical data, for example is input to data schema used for data mining. And data output from data mining is input to production data. Nevertheless, by convention in the following discussion, "input data," "input schema," "output data," and "output schema" refer to inputs and outputs to and from data mining algorithms in data mining models.

The term "program" or "computer program" is used in this specification to refer to executable computer programs as well as executable processes and lightweight processes or threads. The terms "program," "process," and "thread" generally are used interchangeably in this specification to refer to any sequence of computer instructions capable of storage in computer memory for execution by one or more processors. These terms are used without dependence upon the exact state or status of the program in question, whether it is compiled, interpreted, assembled, linked, dynamically linked, defined in a class, instantiated in an object, or presently resident in random access memory as such. Readers skilled in the art will immediately understand that all such program statuses, as well as many others, are well within the scope of the present invention.

The present invention is often described in this specification in conjunction with the well-known IBM data mining tool called "Intelligent Miner." Of course persons skilled in the art will realize immediately that any general-purpose data mining tool providing standard data mining functionality is useful to carry out the pertinent data mining steps of the present invention.

Turning now to FIG. 1, an exemplary embodiment of the invention is seen in which an analytic application developer (102) identifies (104) at least one business problem (106) and identifies a mining algorithm (108) useful in solving the at least one identified business problem (106). The analytic application developer, in the illustrated embodiment, also designs data schema (110), which in typical embodiments includes input data schema and output data schema, useful for providing data input to and output from the identified mining algorithm and defines a data mining model (112), thus creating a model definition (114), for use in solving the business problem.

In the illustrated embodiment, a scheduler (116) launches execution of a process for populating (118) mining data tables (120) with historical data (130). An alternative embodiment is shown as populating the mining data schema or data tables (120) with production data (128). "Production data" refers to an end user's usual operational data store. "Historical data" refers to data extracted over time from the production data. Because the historical data is extracted over time, in some embodiments the historical data is a superset of the production data in that the historical data includes also data extending over a longer period of time than is maintained in the production data or summaries of historical data that are not maintained in production data. In some embodiments the historical data is a subset of the production data in the sense that history is maintained on fewer fields or data elements than reside in production data. How closely aligned in time the historical data is with respect to production data depends on how often additional historical data is extracted from production data. Any useful extraction schedule is well within the present invention.

The mining data tables (120) are comprised of the input data schema from the designed data schema (110). In typical embodiments, the input data schema, which are typically populated from the historical data, are a subset of historical data elements. In the illustrated embodiment, the model definition (114) comprising an untrained data mining model is trained by a training process (122) begun by an automated scheduler (116) to train (122) the untrained data mining model defined in the model definition (114). Training (122) creates a trained model (124).

In the example embodiment of FIG. 1, the functions of the scheduler (116) are shown also to include scheduling execution of a process (118) for populating data schema (120) with historical data (130) or with production data (128). The functions of the illustrated example scheduler (116) embodiment of FIG. 1 also include scheduling execution of a process for data scoring (126). The scoring process (126) uses the trained data mining model (124) to score data from the mining data schema (120), which in FIG. 1 are labeled "Mining Data Tables."

In typical embodiments, trained data mining models include repositories of knowledge obtained through training, which knowledge is gathered and stored in repositories that are referred to in this specification as "knowledge bases." The term "knowledge base" is used generally in this specification to mean an encoding of mining model training results using one or more mathematical concepts such as rules, distance functions, similarity matrices, trees and graphs as appropriate for the mining algorithm under consideration.

Many embodiments implement data stores for storing multiple data mining model definitions along with related knowledge bases; in this specification such data stores containing multiple knowledge bases and multiple data mining model definitions are referred to as "mining bases." The contents of knowledge bases depend on the kind of data mining algorithm selected for use in a particular data mining model. Knowledge bases used with radial basis function algorithms, for example, contain data describing fitting centers and weighted sums. Knowledge captured in a knowledge base through model training is used by data mining tools internally in applying a data mining model through production training and production scoring. A trained model, as shown in FIG. 1, is typically used to score (126) historical data (128), although as will be discussed below in more detail, some embodiments conduct production scoring directly against production data (128).

In addition to the example embodiment just discussed, as shown in FIG. 1, this specification provides below discussions of additional exemplary embodiments developed with respect to an exemplary problem regarding business sales revenue.

Identifying a Business Problem to be Solved

In the domain of e-commerce, consider the following business problem:

"Predict sales revenue for an e-commerce business enterprise from any new shopper."

This business problem requires predicting for each new shopper the amount of revenue the shopper is expected to contribute to the business. Although the business problem is phrased in plain English, it is important to note that the business problem must be one that is amenable to semantic definition in terms capable of representation in data elements for automated computation.

More specifically, the problem to be solved must be capable of expression through the use of referents that are defined in a specific computational domain. Defining referents in a specific computational domain means that a problem is selected for analysis that is capable of being described by use of words having analogous data elements in a specific computational data structure or data store. That is, a problem in order to be eligible for solution within the present invention must be one capable of being stated in plain human language having elements of language within the statement of the problem, and, for each of the elements of language having factual content, there must exist in a defined data structure data having a semantic relation with the language elements of the statement of the problem. By "semantic relation" is meant that the data elements correspond to, evaluate, or identify factual aspects of the problem that are needed to solve the problem.

In the case of the problem stated above regarding shopper sales revenue, for example, data elements corresponding to, evaluating, or identifying shoppers and sales revenue must be capable of inclusion in computer data schema in order for the problem to be one that is amenable to solution within the present invention. In the present example, data elements representing sales revenue clearly can be stored in a numeric memory variable. Similarly shopper identification codes are stored in text or numeric memory variables. Shopper attributes such as age, gender, annual household income, years of education, or zip code, also are capable of representation and storage in computer data elements.

Although the particular business problem regarding sales revenue is selected to illustrate how analytical applications are built to automate solutions for business problems without requiring mining expertise from end users, it is clear to those skilled in the art that it is well within the scope of the present invention to solve many other business problems in addition to the present example regarding shopper sales revenue. Additional business problems addressable by use of the present invention include, for example, (1) the question of how incentive campaigns affect sales revenue for customers and (2) the question of how frequent visits by sales representatives affect sales revenue for customers who are young.

Selecting a Mining Algorithm Needed to Solve the Business Problem

A further step in the inventive method is identifying a mining algorithm useful for solving the business problem. There are a number of data mining algorithms that are effective for solving various kinds of business problems, including for example, demographic and neural clustering algorithms, the tree and neural classification algorithms, radial-basis-function ("RBF") and neural value-prediction algorithms, and the associations algorithm. For information regarding data mining algorithms, the reader is directed to "Data Mining Techniques: For Marketing, Sales, and Customer Support", by Michael J. A. Berry and Gordon Linoff (John Wiley & Sons; ISBN: 0471179809, 1997). Because the exemplary case under discussion requires predicting the value of sales revenue, in accordance with the inventive method, the data mining algorithm known as the value-prediction algorithm is selected as the algorithm needed to solve the business problem. The determination to use a particular data mining algorithm, in this example, the value-prediction algorithm, is made by the analytic application developer who is required to have data mining expertise. It is the end user of the analytic application that is freed by the inventive method from requiring data mining expertise.

Defining Data Schema to be Used as Input to and Output from the Mining Algorithm Embodiments of the present invention typically include predefined data schema to be used as input to and output from data mining algorithms. The data schema are defined by the analytic application developer. In the case of the present exemplary embodiment, input data schema required for solution of the business question are embodied in a database table having the data elements set forth in FIG. 2. The data elements of the schema (200) illustrated in FIG. 2 include "shopper_id" (202), a unique identification code for a shopper; "income" (204), the shopper's household income rounded to the closest $5,000.00; "age" (206), the shopper's age rounded to the nearest multiple of 5; "gender" (208), the shopper's gender, male or female; "household" (210), the number of members of the shopper's household; and "sales_revenue" (212), the sales revenue contributed by the shopper rounded to the nearest $100.00.

The "Standard Query Language", or "SQL," is an industry-standard data base query language. The industry-standard SQL Data Definition Language ("DDL") is often used to create data schema or record structures for inclusion in data stores or files. In this specification, scripts operable as DDL scripts for creating data structures in files are referred to as DDL scripts or as SQL scripts or as SQL DDL scripts. The following DDL is an example of a script useful within the present invention to create the database table SHOPPER, based upon the schema described above and illustrated in FIG. 2:

```
create table SHOPPER
(
        shopper_id bigint NOT NULL,
        income integer,
        age integer,
        gender character(1),
        household integer,
        hist_sales_revenue double,
        pred_sales_revenue double,
        PRIMARY KEY (shopper_id)
)
```

The first five attributes shopper_id, income, age, gender and household, in the example data structure shown just above, typically are data attributes of the shopper both in historical data and in production data. In contrast, the attribute for storage of historical sales revenue hist_sales_revenue in typical embodiments has known value in historical data because it is common in embodiments of the invention to store in the historical data records the cumulative amount of money past shoppers have spent on the subject e-commerce site.

The value of a field for predicted sales revenue, like pred_sales_revenue, however, is often known in production data and unknown in historical data, where the field is typically used to store in production data predicted values of sales revenue for new shoppers because the analytic application before it is operated to score production data has not yet recorded predicted values of how much money new shoppers may spend. The value of pred_sales_revenue is predicted using data mining techniques. Fields identified within a data mining model as fields whose values are to be predicted are called "prediction fields." Because the value of pred_sales_revenue is to be predicted in the present example, pred_sales_revenue is called a prediction field.

It is useful to note that the use of specific fields and field names will vary across embodiments. In embodiments that store only cumulative sales revenue in historical data and only predicted sales revenue in production data, there is no need to distinguish those stored values in a particular data structure, and input data schema in such embodiments often contain therefore a single field sales_revenue which is used, for example, as an input field for development training, the pertinent schema being capable of creation by use of the following DDL script:

```
CREATE TABLE SHOPPER
(
        shopper_id bigint NOT NULL,
        income integer,
        age integer,
        gender character(1),
        household integer,
        sales_revenue double,
        PRIMARY KEY (shopper_id)
)
```

Defining data schema includes defining output data schema. The principal useful output of the data mining algorithm is the value prediction or data classification that is the purpose of the data mining model in use. The output of the data mining algorithm is scored data to be stored with production data. That is, the results of the data mining, the data in the output data schema, in order to be useful is to be deposited in the end user's repository of production data. Moreover, the output results need to be returned to a meaningful location within the production data. Output data schema therefore typically contain one or more prediction fields and one or more key fields for finding within the production data the correct location for storage of the data mining output results.

In the exemplary embodiment regarding shopper sales revenue, as shown in FIG. 2, there is available for inclusion in output data schema a single-field unique key for location of shopper data, "shopper_id" (202). The output data schema in the example embodiment also includes a field for storage of the predicted sales revenue, the prediction of which is the principal purpose of the exemplary embodiment under discussion.

Thus in the exemplary embodiment under discussion, the output schema includes two fields: a unique key for location of shopper data and a field for predicted sales revenue. Embodiments utilizing multi-field keys rather than single-field keys typically include all the fields of such multi-field keys, and the output schema in such embodiments therefore comprises more than two fields. As illustrated in FIG. 3, the data mining model definition includes a file name for the output data schema, and the name of the file containing the output data schema in the exemplary embodiment regarding shopper sales revenue is depicted as "Output sales_revenue" (336).

Defining a Data Mining Model Based on the Data Schema

Embodiments of the present invention include predefined data mining models. Defining a data mining model typically includes operating the model's principal algorithm in a training mode. The algorithm discussed in the present exemplary embodiment, the value-prediction algorithm, has two modes, a training mode and a scoring mode. In training mode, the value-prediction algorithm builds a data mining model based on a subset of the selected input data, that is, a subset of the historical data. The rest of the input data is used implicitly by the algorithm to test the quality of the model as trained.

The remaining historical data is used to test the trained model because for the historical data, the answer to the question of sales revenue is already known for all the shoppers represented in the historical data. That is, a data mining algorithm carries out development scoring upon the remaining historical test data and then immediately determines the quality of the scoring because the correct scoring is already known for this class of data.

Training a data mining model typically involves training the data mining model using a portion of the input data immediately followed by a test using all or part of the remaining historical data. In the test phase the training model is made to predict the sales revenue. This predicted value is then compared with the known value of sales revenue. Model quality is decided based on how well the model predicts sales revenue.

It is useful to note that the training under discussion is development training in support of defining a data mining model. Development training is part of defining a data mining model that works well for the particular business question to which it is directed.

Development training is conducted in a cycle of training and testing for the purpose of identifying data mining model parameters, parameter that in fact comprise the definition of a particular data mining model. Development training is work requiring a high level of specific expertise in data mining. The result of development training is a predefined data mining model, including a data mining model definition, for inclusion in an analytic application for use by a end user.

In contrast, production training of a data mining model for use with end user production data is training a predefined data mining model already known to work well in solving the business question to which it is addressed. That is, production training is training a predefined model to work with the particular historical data for the end user's actual production data, in the exemplary embodiment under discussion, actual shopper data.

Production operation of a data mining model requires a knowledge base for the model. The knowledge base is generated in dependence upon the actual data upon which the mining model is to be used, generated by operation of the data mining model in production training mode, which is referred to as "production training." Production training generates the knowledge base.

Because the knowledge base typically is not supplied with the analytic application and the knowledge base is required prior to beginning normal production operations in analytic applications implementing automated data mining according to the present invention, a first instance of production training can be viewed as in effect a kind of installation step by the end user. In this context, "installation step" means that production training must be done at least once before an end user can begin production scoring. That is, production training is performed at least once as a preparatory step prior to any production scoring. Initial production training of a data mining model in typical embodiments is triggered by an automated scheduler, thus requiring no specific expertise in data mining on the part of end users. Recurrent operational production training typically is triggered by a script or API call pursuant to a schedule driving a scheduler such as Unix's "cron."

Predefined data mining models are production trained more than once. Data mining models in analytic applications from time to time need their training, that is, their knowledge bases, refreshed because the fundamental characteristics of the underlying production data change over time. In the embodiment regarding shopper revenue, for example, the characteristics of the population of shoppers comprising the production data will drift over time. Production training of a data mining model, however, from the point of view of an end user, is an automated step to be performed under control of an automated scheduler, thereby requiring no particular expertise in data mining on the part of end users.

The data mining model, whether performing development scoring or production scoring in actual production, predicts a value for one or more prediction fields. The term "scoring" refers to a process of predicting a value for a prediction field. Other fields, typically included in input schema, that are used by a data mining algorithm to help predict the prediction field are called "predictor fields," or simply "predictors." In the case of the example under discussion, the predictor fields are income, age, gender, and household. In production scoring, the data mining algorithm applies the trained model on production data. In development scoring, the data mining algorithm is applied to historical data or to samples of historical data. In production scoring, a predefined data mining model is applied on actual production data, or, in some embodiments, to historical data, in order to generate prediction outputs for storage in production data.

An example of a definition of a data mining model is set forth in FIG. 3. In particular FIG. 3 illustrates parameters defining a data mining model for the exemplary embodiment regarding shopper revenue. FIG. 3 is organized in three columns illustrating respectively the purpose, name, and example values for model definition parameters useful in predicting shopper sales revenue.

The model definition shown in FIG. 3 includes the settings parameters "Name" (302) and "Mining function" (304). The model Name (302) is set to "Shopper settings," indicating that the model under definition is the model to be used for predicting shopper revenue. Data mining model definitions are typically embodied in data structures for storage in computer memory, and when so embodied, the model Name (302) typically is used as a pointer or search field to retrieve from storage either the entire model definition or data elements from the model definition.

The "Mining function" parameter (304) is set to "Prediction—Radial Basis Function," indicating that the radial basis function algorithm is to be used for value-prediction. Other algorithms are used in various embodiments of definitions of data mining models, but in the one shown for example in FIG. 3, the radial basis function algorithm is selected.

The radial basis function algorithm is a data mining algorithm particularly designed for value prediction as such, as opposed to data classification or pattern matching. The purpose of value prediction is to discover the dependency and the variation of one field's value (that is, a prediction field) upon the values of other fields (that is, predictor fields) within the same record of input data. A model is generated that has the capability of predicting a value for that particular prediction field in a new record of the same form, based on the predictor field values.

In the present example regarding shopper revenue, an end user such as a retailer wants to use historical data to predict the sales revenue for a new customer. One or more runs of development training, using the historical data as input data, creates a defined data mining model. The defined data mining model is then used to predict the expected sales revenue for a new customer, based on the values of the predictor fields for the new customer, that is, based upon the data elements or fields that describe the new customer and comprise predictor fields for use by the value prediction algorithm, the radial basis function algorithm, in the data mining model.

The data mining algorithm functions by processing a table of input data in which every record has an identical format. A single field within the table, the prediction field, is to be designated as containing the value to be predicted, while the coordinates, the predictor fields, are selected from the other fields in the table.

The radial basis function algorithm is used to predict values of a prediction field which value is a function of a multiplicity of variables, that is, a function of data comprising more than one predictor field. The radial basis function algorithm is used to create a data mining model that predicts the value of a particular prediction field from the other attribute values, the predictor fields.

The predictor fields form an attribute space. The radial basis function algorithm operates by use of a number of fitting centers disposed in the attribute space. A fitting center is a vector in the attribute space. At each fitting center, a basis function is defined. A basis function is a nonlinear function of distance from the fitting center at which the basis function is defined. The basis functions are called radial basis functions because they have the same value for any point having the same distance or radius from the fitting center. The prediction given by the radial basis algorithm for a particular set of attributes or prediction fields (called a "point") is a weighted sum of the basis function values calculated at that point.

During the operation of the radial basis function algorithm, the weighted sums of values producing the best predictions are determined by the algorithm at each fitting center. In addition, the radial basis function algorithm determines where the fitting centers are to be placed in the attribute space for best operation of the algorithm. The fitting center locations in the attribute space and the weighted sums of values producing best predictions are gathered into data structures and stored in a knowledge base. A trained model in effect comprises a set of defining parameters, generally referred to in this specification as a data mining model definition, an example of which is shown in FIG. 3, and a knowledge base produced by operation of a data mining model in production training mode. The reader is directed to IBM's user guide for Intelligent Miner, "Using Intelligent Miner for Data," Volume 6, Release 2, Chapter 16, incorporated herein by reference, for information regarding typical usage of the radial basis function algorithm.

The details of knowledge base construction for data mining are not recounted in this specification. The details of knowledge base construction for data mining are complex, and they differ across algorithms. As mentioned above, radial basis function algorithms produce knowledge bases containing data comprising fitting centers and weighted sums. Tree classification algorithms produce knowledge bases comprising classification rules. Demographic clustering algorithms produce knowledge bases comprising model statistics including distributions of members across clusters. For information regarding knowledge bases, the reader is directed to "Data Mining Techniques: For Marketing, Sales, and Customer Support", by Michael J. A. Berry and Gordon Linoff (John Wiley & Sons; ISBN: 0471179809, 1997).

Again referring to FIG. 3, example parameters comprising a data mining model definition are seen. The Input Data parameters include "Input Data" (306) and "Optimize mining run for" (308). In the example as illustrated in FIG. 3, Input Data is set to "Shopper data," indicating the data file from which historical data is to be read for training the model. The "Optimize mining run for" element is set to "Time," indicating that built-in optimization functionality in the data mining product in use in the example is to be administered automatically in favor of speedy operation.

The Mode parameters in the model definition include "Use mode" (310), "In-sample size" (312), "Out-sample size" (314), "Maximum number of passes" (316), "Maximum centers" (318), "Minimum region size" (320), and "Minimum passes" (322). In the example as illustrated in FIG. 3, "Use mode" (310) is set to "Training mode," indicating that model operation is set to effect model training.

The Mode parameter "in-sample size" (312) in the illustrated example is set to "2," representing the number of consecutive records to select from the input data to be used for training. During model training, model training operations use one portion of the historical data for building a development model and a second portion of the historical data to verify the accuracy of the development model. During the verification phase, the number of records specified in "in-sample size" is skipped, excluded from the data used for verification. The Mode parameter "out-sample size" (314) is set to "1," representing the number of consecutive records to select from the input data to be used when model training shifts to the verification phase to determine whether desired accuracy and error limit objectives for the model under development have been met. When these goals are met, the training process ends.

The value for "maximum number of passes" (316) is set to "4," limiting the number of times the data mining model goes through its input data in training mode. Prediction accuracy is checked typically after each pass through the input data. If the model reaches the desired prediction accuracy before this limit is reached, training will stop.

The value for "maximum centers" (318) is set to "10," limiting the number of fitting centers created by the mining function at each pass through the input data. The actual number of centers might be higher than the number specified as a parameter in the model definition as "maximum centers" (318) because the number of centers typically increases beyond the value of maximum centers, perhaps as much as twice the value of maximum centers, during a training pass through the input data.

The radial basis function algorithm works by choosing a weighted sum of a set of non-linear functions called radial basis functions. The radial basis functions are each fitted to separate regions in the input space. The regions are chosen so that the prediction field values output are similar within a region, so that the radial basis function is likely to produce accurate prediction field values. For each selected region, a fitting center is created that predicts the average value of the region. More specifically, the fitting center comprises the regional average prediction field value. Data points that fall between regions are predicted by taking a weighted average of the predictions of all fitting centers, where the weight for a fitting center decays rapidly with the distance of data points from the fitting center.

In order for a region to be useful in operation of the radial basis function algorithm, the region needs to have some minimum size. In the example data mining model definition illustrated in FIG. 3, the value for "minimum region size" (320) is set to "5", indicating the minimum number of records or data points to be assigned to a region. If at the end of a pass a region has a size smaller than the specified minimum region size, the region is deleted. For additional information regarding the definition and use of fitting centers and regions in data mining algorithms, the reader is directed to "Discovering Data Mining—From Concept to Implementation" by Peter Cabena, et al, Prentice Hall (New Jersey 1988).

In FIG. 3, the value for "minimum passes" (322) is set to "2," indicating the minimum number of passes through the sample historical input data during operation of the model in training mode. During passes numbering less than the specified minimum, in typical embodiments, no checking for accuracy is done. In some embodiments, it saves processing time to set some minimum number of passes to be made without accuracy checks, although a large value for minimum passes generally ought to be specified only when there is a large quantity of available training data and the analytic application developer is certain that a good model exists.

The Input fields parameters in the model definition include "Active fields" (324), "Supplementary fields" (326), and "Prediction field" (328). In the example as illustrated in FIG. 3, the "Active fields" (324) are the predictor fields, and the parameter "Active fields" (324) is set to "income, age, gender," indicating that the fields income, age, and gender are to be used by the data mining model as predictor fields to train the model to predict sales revenue from new shoppers.

Many embodiments of data mining tools provide statistical services related to model training or data scoring. In IBM's Intelligent Miner, for example, data mining statistics are maintained both for the "Active fields" (324) (that is, the predictor fields) and also for the "Supplementary fields" (reference 326 on FIG. 3). In the model defined for example in FIG. 3, the fields used for statistical purposes exclusively, rather than for prediction, are referred to as "supplementary fields." These supplementary fields do not directly affect the process of developing or training a data mining model. In the example of FIG. 3, "Supplementary fields" (326) is set to "household," indicating that mining-related statistics will be generated or maintained for the field "household," although "household" is not used as a predictor field in the present example.

In the example model of FIG. 3, "Prediction field" (328) is set to "sales_revenue," indicating the value of the field sales_revenue is the value to be predicted by the model. That is, sales_revenue is what the model is to train to predict, and sales_revenue is the value to be predicted in development scoring operations and eventually also in operations scoring.

Quantile ranges are subsets of data within a specific range of the predicted value. The quantile limits represent the lower and the upper percentage of the predicted value. For example, the quantile range Q[50,75] contains records whose predicted values are between the quantiles Q(50) and Q(75) of the multiset of all predicted values. If quantiles are generated, a data mining model is used to classify the value in the prediction field according to the quantile in which it falls. In the model defined in FIG. 3, however, the quantile field "generate quantiles" (330) is set to "no," indicating that the data mining model as defined in FIG. 3 will not generate quantiles.

The Output fields parameters are "Output fields" (332) and "Predicted value field name" (334). In the example as illustrated in FIG. 3, Output fields is set to "shopper_id," indicating that the value of the field named "shopper_id" is to be copied directly from the input data to the output, in this case carrying through a unique identification of a shopper from the input to the output. The layout of the output data corresponds to the appropriate input data. The output data includes the fields specified in "output fields" (332), i.e., the specified output fields are copied into the output. In addition, the model as defined specifies the "predicted value field name" (334). In the illustrated example embodiment, the "predicted value field name" (334) is separately identified as "Predicted sales_revenue" because it must be output regardless whether other output fields are specified. "Predicted value field name" (334) is set to "Predicted sales_revenue," indicating that the predicted values of sales revenue generated by operation of the data mining model are to be written to an output record field named "Predicted sales_revenue."

The Output data parameter "Output data" (336), in the example data mining model definition as illustrated in FIG. 3, is set to "Output sales_revenue," indicating the data file where the output fields are to be written.

By default in typical embodiments and for example in IBM's Intelligent Miner, a result object, such as an output file, takes on the name of the settings object that created the results. In this example, the settings object is the data mining model definition illustrated in FIG. 3, a model definition having the name "Shopper settings" (302). Thus there would typically be no need to specify a result name when running the settings object, the data mining model, for the first time. However, an analytic application developer might want to run the settings object again and keep the old results. In this case, the developer would need to change the original result name, particularly when as in the example of FIG. 3, the model is set (340) to overwrite previous results having the same name as current results. In the example of FIG. 3, the results name (338) is set to "Prediction model for sales_revenue."

The terms "train a model," "generate a production model," and "create a model for use in production scoring" all mean the same thing. In this sense, a trained model includes a model definition of the kind illustrated in FIG. 3. In addition to the model definition, a "production model" or "trained model" includes also the knowledge base generated by operation of the model in training mode.

In a production model, that is, a typical embodiment of a trained data mining model used to score actual input data, the Mode parameter "Use mode" (310) in the model definition will be set to "application mode," indicating that the model will carry out data scoring without accuracy checks. Typically in application mode, accuracy checks are not carried out because in some embodiments there are no historical data regarding prediction field values against which accuracy checks can be made and also because accuracy checks slow production operations. Accuracy checks typically are pertinent for predefining data models during development of an analytic application by an analytic applications developer. In production scoring, embodiments typically use a trained data mining model created in training mode to predict a value for a specified prediction field for every record in the new input data, the new input data comprising typically large quantities of end user production data. The data format for input to the production model is typically identical to that used to generate the model in training mode.

Populating Input Data Schema with Historical Data or Production Data

The inventive method includes populating data schema with sample historical data. This step in typical embodiments is automated by use of a scheduler. Schedulers useful with the invention include the well-known Unix cron utility and the scheduler component of IBM's DB2 Warehouse Center. Other useful schedulers will occur to those of skill in the art. Any software application capable of beginning execution of a computer program in accordance with a stored, predefined schedule is useful with the invention.

The inventive method includes populating input data schema with historical data, that is, extracting data from a repository of historical data and writing that data into the input data schema. Populating input data schema is automated within the present invention, therefore not requiring special expertise in data mining on the part of end users.

Figure 4:
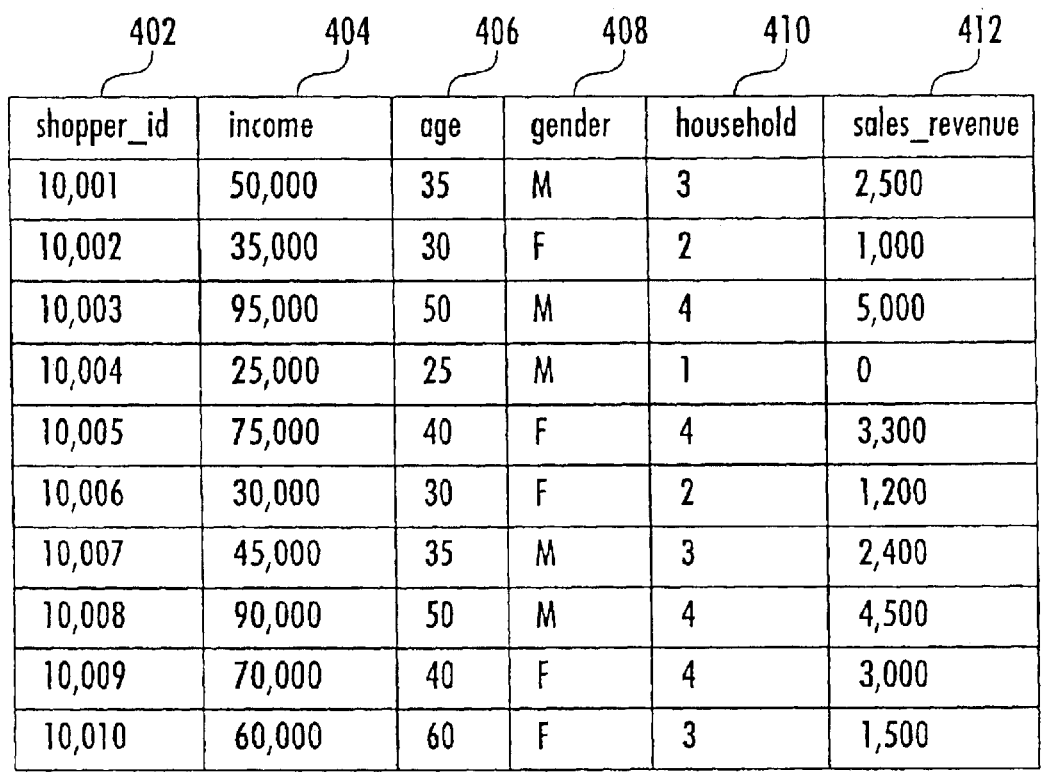
FIG. 4 is an example of historical data used for training a data mining model.

FIG. 4 illustrates an example of historical data (400) useful in the example embodiment to populate input data schema comprising an input to a data mining model operating in production training mode. As illustrated in FIG. 1, in typical embodiments of the inventive method, data mining tables (120) implementing input data schema (110) are populated (118) from databases of historical data (130). FIG. 4 illustrates an example of the input data schema (110) that is shown in context in FIG. 1.

Although populating input data schema is sometimes described in this specification as a capability of an analytic application, persons skilled in the art will realize that there are many ways to populate data schema, all of which are well within the scope of the present invention, including, for example, scripts operating at the level of an operating system and compiled programs capable of calling API functions in APIs associated with particular database management systems.

The populating procedure (118 on FIG. 1) extracts from historical data (130) the data needed for use in a particular data mining model. Because the example model is designed to address the business problem of predicting shopper sales revenue by use of data schema designed for that purpose, the data elements in the populated input data schema illustrated in FIG. 4 are shopper_id (402), income (404), age (406), gender (408), household (410), and sales_revenue (412), each of which has the same meaning and usage as described above in our discussion of the exemplary input data schema.

In a more detailed example embodiment, data mining input/output tables are in a schema called MINING. Thus, a SHOPPER table, which is used for mining input, is referred to as MINING.SHOPPER and created by the following SQL DDL script.

```
CREATE TABLE MINING.SHOPPER
(
        shopper_id bigint NOT NULL,
        income integer,
        age integer,
        gender character(1),
        household integer,
        sales_revenue double,
        PRIMARY KEY (shopper_id)
)
```

In this additional example embodiment, the historical data is in a schema called HIST and that in HIST there is a table called SHOPPER, which is created using the following SQL DDL script.

```
CREATE TABLE HIST.SHOPPER
(
        shopper_id bigint NOT NULL,
        income integer,
        age integer,
        gender character(1),
        household integer,
        hist_sales_revenue double,
```

```
        pred_sales_revenue double,
        . . .
        PRIMARY KEY (shopper_id)
)
```

In this example embodiment, while the columns shopper_id, income, age, gender, household are the same in both tables, MINING.SHOPPER has sales_revenue whereas HIST.SHOPPER has hist_sales_revenue and pred_sales_revenue. In typical embodiments, as in this embodiment, as denoted by the ellipsis in CREATE TABLE HIST.SHOPPER, HIST.SHOPPER has many other fields generally useful in describing shoppers but not pertinent to data mining for the example business problem of predicting shopper sales revenue.

A SQL DDL script to extract shopper records from the historical table HIST.SHOPPER for only those shoppers whose income is more than $25000 and copy these into the mining input table MINING.SHOPPER is given below. Note that the script copies HIST.SHOPPER.hist_sales_revenue into MINING.SHOPPER.sales_revenue.

```
UPDATE MINING.SHOPPER
SET
(
        shopper_id,
        income,
        age,
        gender,
        household,
        sales_revenue
) =
(
        SELECT
          shopper_id,
          income,
          age,
          gender,
          household,
          hist_sales_revenue
        FROM HIST.SHOPPER
        WHERE HIST.SHOPPER.income > 25000
)
```

In the example embodiment under discussion, this script named EXTRACT.SQL and is inserted into a text file of that name.

In the present example, a two-column table for storage of production scoring output is created by the following DDL script:

```
CREATE TABLE MINING.SCORING
(
        shopper_id bigint NOT NULL,
        pred_sales_revenue double,
        PRIMARY KEY (shopper_id)
)
```

An example production scoring step populates the two column output table in the MINING schema called MINING.SCORING which is created by use of the SQL script set forth just above. After production scoring, the value of pred_sales_revenue is published back either to the historical data or to the production data depending on the business needs. In typical embodiments a prediction field such as pred_sales_revenue is published back to the historical data so that analytic reports can be generated based on this data. A SQL DDL script to extract scoring data from MINING.SCORING and copy it into HIST.SHOPPER is given below. Note that the example script copies MINING.SCORING.pred_sales_revenue into HIST.SHOPPER.pred_sales_revenue.

```
UPDATE HIST.SHOPPER
SET
(
        pred_sales_revenue
) =
(
        SELECT pred_sales_revenue
        FROM MINING.SCORING
)
WHERE HIST.SHOPPER.shopper_id =
MINING.SCORING.shopper_id
```

This example script is named PUBLISH.SQL and is inserted into a text file of the same name.

The example embodiment under discussion uses the EXTRACT.SQL and PUBLISH.SQL scripts as components of a larger script that automates the steps of extraction, training, scoring, and publishing.

Using IBM's DB2 Universal Database as the database tool, the example integrated mining automation script takes the following form and in typical embodiments is embedded in a batch file for execution on most current operating systems.

db2 extract.sql idmmbruns commerce_mb "Shopper training setting"

idmmbruns commerce_mb "Shopper scoring setting"

db2 publish.sql

Production Training of the Data Mining Model by Use of Sample Historical Data When the input data schema is populated with historical data, the data mining model is capable of being production trained using the historical data in the input data schema. To distinguish development training, this training step is referred to as "production training." In typical embodiments of the present invention, production training is automated through use of a scheduler. To carry out production training of the data mining model, the end user installs an analytic application and set a production training schedule for a scheduler by use of standard GUI tools, pull down menus, and button clicks. It is possible for the end user to carry out production training of the data mining model with no special expertise in data mining because the necessary data mining related information is already provided in the definition of the data mining model, the definition previously prepared by the analytic application developer.

Development training and production training are to be distinguished. Development training is carried out by an analytic application developer having special expertise in data mining. Development training is an iterative process of operating a data mining model against test samples of historical data in order to predict prediction values when an historical value for a prediction field is already known. The accuracy of the prediction is checked against the known value in the historical data, and the data mining model parameters are adjusted until the most accurate prediction is produced. The test samples of historical data are samples developed for use by the analytic application developer. The test samples sometimes are synthetic and sometimes are derived from a client or customer end user's actual historical data.

In contrast, production training is preparing a data mining model in a particular end user's installation so that the model functions correctly using as its principal input actual production data from the end user's production data store. Production training comprises running the data mining model in training mode using end user historical data in the input data schema. Production training is carried out periodically. Unlike the cyclic repetition of development training, however, periodic repetition of production training is not part of defining the data mining model. By the time an analytic application arrives for installation at an end user's installation site, the data mining model or models included within the analytic application are already defined, that is, predefined by an analytic application developer.

The purpose of carrying out production training periodically is to address the fact that the underlying nature or distribution of the production data may change somewhat over time. In the exemplary embodiment regarding shopper sales revenue, the behavior of end users' customers or shoppers changes somewhat over time. Periodically repeating production training tunes the installed data mining model for best performance with a particular end user's actual production data as the nature of the production data changes over time.

Analytic applications embodying the present invention typically include predefined data mining models. Such analytic applications include data mining tools, such as, for example, IBM's Intelligent Miner. These data mining models are loaded into the data mining tools when the analytic application is configured for installation at the end user's installation site.

Figure 5:
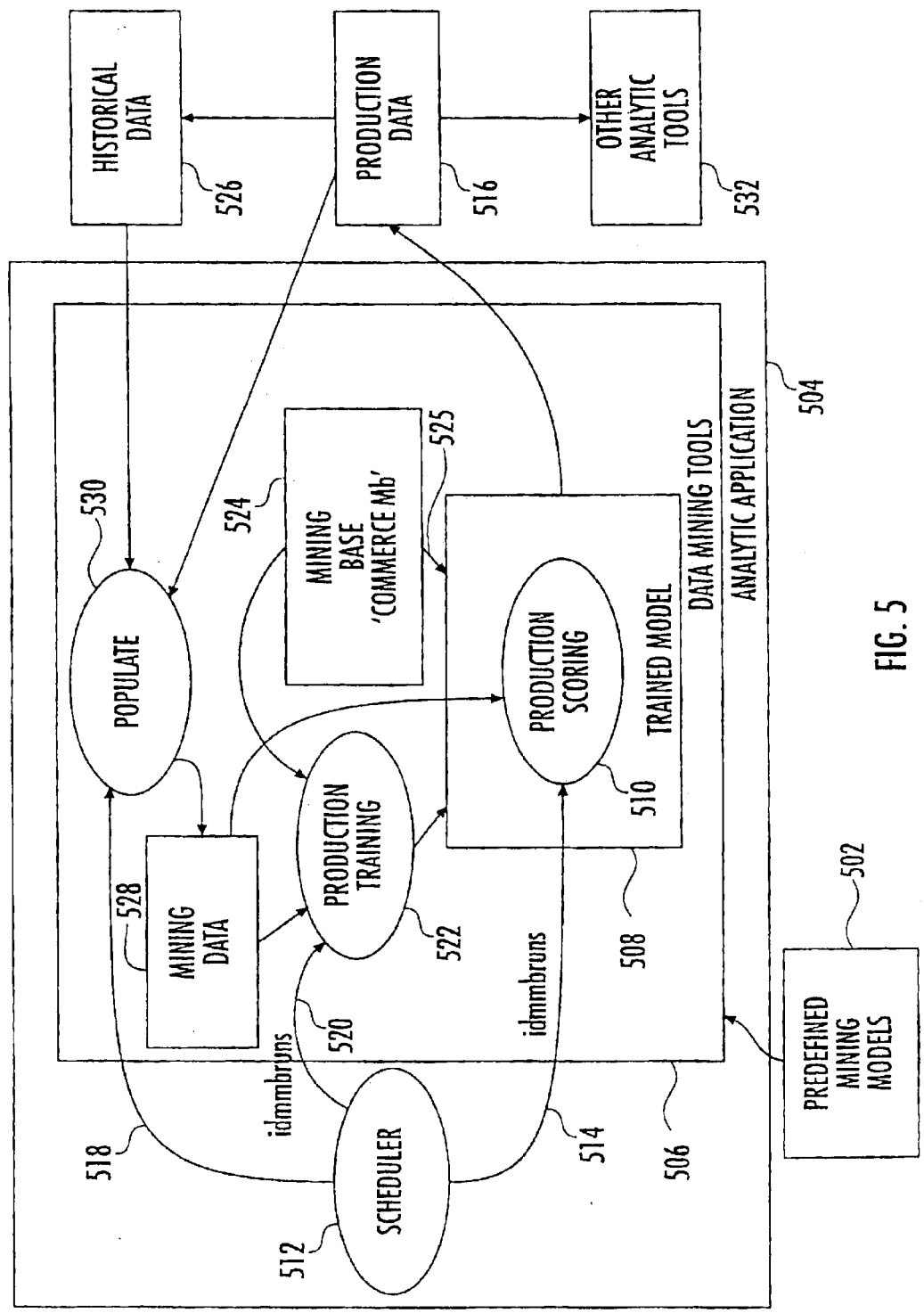
FIG. 5 is a process flow diagram for exemplary embodiments.

Turning now to FIG. 5, an embodiment is seen in which data mining tools (506) such as those embodied in IBM's Intelligent Miner are used to illustrate the operation of the invention. The object (524) within Intelligent Miner that holds the data mining model definitions is called a 'mining base.' In the example embodiment illustrated in FIG. 5, the name 'commerce_mb' is used for the mining base. Data mining tools typically provide application programming interfaces ("APIs") through which data mining functions within the tools are called. API calls in many embodiments are issued through scripts that execute in the environment of a computer operating system.

As shown in the illustration, Intelligent Miner is a data mining tool that provides a such a script (520, 514) for executing production training in accordance with a particular data mining model in the analytic application. In Intelligent Miner, the script is called 'idmmbruns.' Idmmbruns takes parameters identifying the mining base in which a data mining model is stored and the particular data mining model to be used.

In the case of training a production model to answer the question of shopper revenue, the prediction data mining model stored in the mining base commerce_mb is trained in typical embodiments by using data from the populated data schema by invoking the following command at the operating system level:

idmmbruns commerce_mb "Shopper training setting"

Idmmbruns when so executed causes Intelligent Miner to find in the mining base named commerce_mb the data mining model definition named "Shopper training setting" and execute a data mining algorithm in training mode to use the definition to create a trained data mining model. The data mining algorithm operated in training mode has an output of a knowledge base. The trained data mining model includes the data mining model definition and the knowledge base. In some embodiments, the trained data mining model is stored in a mining base along with other data mining models. The data mining model definition itself identifies the data store containing the populated data schema having the sample historical data for use in production training. The data mining model definition itself contains the defining parameter establishing that when invoked in this manner the model will operate in training mode.

Production Scoring Input Data Using the Trained Model

The inventive method includes production scoring of input data by use of a production-trained data mining model. Some embodiments conduct production scoring on input data extracted from historical data, and some embodiments conduct production scoring on input data extracted from production data rather than historical data. The data mining model predicts a value for a prediction field for each data record in the model's input data. The term "scoring" refers to the process of predicting a prediction value by use of the data mining algorithm.

The term "production scoring" refers to scoring of input data by use of a predefined and production-trained data mining model. A predefined mining model that is production-trained comprises a data mining model definition and a knowledge base. In production scoring, the input data in the input schema excludes historical values of prediction fields, or, if the input data schema includes historical values for prediction fields, such values are ignored or not used in production scoring. Production scoring results in predicted values for prediction fields for storage in production data and use in analysis by end users. Production scoring is distinguished from development scoring in that development scoring is carried out on historical data that includes and uses historical values of prediction fields for purposes of defining a data mining model and developing an analytic application.

Because predictor field values are typically available in production data, some embodiments of the present invention read input data for production scoring into input data schema directly from production data tables rather than extracting data for input schema from historical data. Whether to produce score production data depends upon considerations of systems operations. It would be usual, for example, that in a system where an end user's system managers are particularly concerned to conserve data storage space, the managers decide to forego a separate historical data store, maintain in production data a running total of sales revenue for each shopper, establish in production data a field for predicted sales revenue for each shopper, and populate input data schema directly from production data.

In the example regarding predicting sales revenue as shown in FIG. 3, the prediction field is named 'Predicted sales_revenue.' In the example regarding predicting sales revenue, the data output from the operation of the data mining model in production scoring includes predicted values of sales revenue for each data record input. The data records input include one record for each shopper for which sales revenue predictions are desired, the input data records comprising the input data schema for the data mining model in use.

Production scoring in typical embodiments of the present invention is automated by use of a scheduler and therefore requires no specialized expertise in data mining on the part of end users. To carry out production scoring of an end user's production data, the end user only needs to install the analytic application and set a scoring schedule for a scheduler by use of standard GUI tools, pull down menus, and button clicks. It is possible for the end user to carry out scoring of the production data with no special expertise in data mining because the necessary data mining related information is already provided in the definition of the data mining model, the definition previously prepared by the analytic application developer.

Continuing with reference to FIG. 5, an embodiment is seen in which Intelligent Miner is used to illustrate the scoring operations of the invention. As mentioned above, the object within Intelligent Miner that holds the data mining model definitions is called a 'mining base' (524). In the example embodiment of FIG. 5, the name 'commerce_mb' is used for the mining base. Data mining tools typically provide application programming interfaces ("APIs") through which data mining functions within the tools are called. API calls typically are issued through scripts that execute in the environment of a computer operating system.

As shown in the illustration, Intelligent Miner is a data mining tool that provides a such a script (514, 520) for executing production scoring in accordance with a particular data mining model in the analytic application. In this case of Intelligent Miner, the script is called 'idmmbruns.' Idmmbruns takes parameters identifying the mining base in which a data mining model is stored and the particular data mining model to be used.

In the case of training a production model to answer the question of shopper revenue, the trained data mining model (508) scores (510) data from the populated data schema by invoking the following command (514) at the operating system level:

idmmbruns commerce_mb "Shopper scoring setting."

Idmmbruns when so executed (514) causes the data mining tools (506) to find (525) in the mining base (524) named commerce_mb the data mining model named "Shopper scoring setting" and execute the found data mining model by scoring (510) data through the trained model (508). The data mining model itself (306 on FIG. 3) identifies the data store containing the populated data schema having the production data for use in production training. The data mining model itself contains the defining parameter establishing that when invoked in this manner the model will operate in production scoring mode (310 on FIG. 3).

Scheduling Alternatives

Populating data schema, production training, and production scoring in typical embodiments of the present invention are automated through use of a scheduler, reference (512) on FIG. 5. Schedulers useful with the invention include Unix cron jobs and the scheduler component of IBM's DB2 Warehouse Center. Other useful schedulers will occur to those of skill in the art. Any software application capable of beginning execution of a computer program in accordance with a predefined schedule stored in computer memory can be used with the invention.

An example of a scheduler useful in various embodiments of the invention is IBM's DB2 Warehouse Center. In using Warehouse Center as a scheduler, for each of the operating system-level scripts needed to invoke any of the steps of populating data schema, production training, or production scoring, a corresponding Warehouse Center step is created which in turn invokes a corresponding operating system-level script. In some embodiments, a combined Warehouse Center step capable of executing in sequence all three of the corresponding operating system-level scripts is created. Alternative embodiments utilize the Warehouse Center's built-in scheduling facility to schedule the individual Warehouse Center steps for execution at different times based on customer preference.

The schedules are entered into a Warehouse Center scheduling table for storage in computer memory. The Warehouse Center table in such embodiments drives the Warehouse Center scheduling facility. The scheduling table needs to be changed only when the end user prefers. In typical embodiments, such changes are infrequent once the pertinent analytic application is fully installed and operational. The actual run-time execution of the scripts is automated by the scheduler, for example the Warehouse Center scheduling facility, and, even on the infrequent occasions when an end user wishes to change a schedule, the end user does so merely by editing a schedule table through the use of standard editors, GUI tools, pull down menus, and button clicks, with no need for special expertise in data mining.

It will be understood from the foregoing description that various modifications and changes may be made in embodiments of the present invention without departing from its true spirit. In particular, although the present invention has been described in terms of business problems generally and sales revenue prediction in particular, in fact the present invention is useful for solving any problem capable of expression through the use of referents that are defined in a specific computational domain. It is intended therefore that descriptions in this specification are only for purposes of illustration and are not to be construed in a limiting sense. The scope of this invention should be limited only by the language of the following claims.

What is claimed is:

1. A method of automated data mining using a domain-specific analytic application for solving predefined problems, the method comprising:

populating input data schema, the input data schema having a format appropriate to solution of a predefined problem;

production training a predefined data mining model to produce a trained data mining model, the predefined data mining model comprising a predefined data mining model definition;

production scoring input data from the input data schema; and scheduling the steps of populating input data schema, production training, and production scoring.

2. The method of claim 1 wherein populating input data schema further comprises reading input data from a data store and writing the input data to the input data schema.

3. The method of claim 2 wherein the data store comprises historical data and populating input data schema further comprises populating input data schema with historical data.

4. The method of claim 2 wherein the data store comprises production data and populating input data schema further comprises populating input data schema with production data.

5. The method of claim 1 wherein:

production training has an input comprising the input data stored in the input data schema and an output comprising a knowledge base, production training further comprises executing a preselected data mining algorithm in production training mode, executing the data mining algorithm in production training mode comprises executing a software process within the analytic application, and the trained data mining model comprises the predefined data mining model definition and the knowledge base.

6. The method of claim 1 wherein production scoring further comprises:

applying the trained data mining model by executing the data mining algorithm in production scoring mode, wherein:

the data mining algorithm executed in production scoring mode comprises a software process within the analytic application, and executing the data mining algorithm has an output comprising production scored data.

7. The method of claim 6 further comprising storing the production scored data in a store of production data.

8. The method of claim 1 wherein scheduling the steps of populating input data schema, production training, and production scoring further comprises:

storing a schedule in computer memory; and executing the steps of populating input data schema, production training, and production scoring in dependence upon the schedule.

9. The method of claim 8 wherein storing a schedule further comprises storing the schedule in a cron table for a scheduler comprising a Unix daemon called "cron."

10. The method of claim 8 wherein storing a schedule further comprises storing the schedule in an IBM DB2 Warehouse Center scheduling table for a scheduler comprising an IBM DB2 Warehouse Center scheduling facility.

11. The method of claim 1 wherein the analytic application comprises:

the predefined problems to be solved, the predefined problems having referents defined in a specific computational domain;

predefined data mining algorithms capable of using input data read from predefined input data schema for solving the predefined problems;

predefined data schema appropriate for solution of the predefined problems, the predefined data schema further comprising the input data schema and output data schema; and at least one predefined data mining model definition, the predefined data mining model definition dependent upon the predefined data schema.

12. The method of claim 11 wherein the predefined data mining algorithms comprise a radial basis function algorithm for value prediction and the production scored data comprises a prediction field containing a value calculated by executing the data mining algorithm in scoring mode.

13. The method of claim 11 wherein the predefined data mining algorithms comprise a neural value prediction algorithm.

14. The method of claim 11 wherein the predefined data mining algorithms comprise a demographic clustering algorithm.

15. The method of claim 11 wherein the predefined data mining algorithms comprise a neural clustering algorithm.

16. The method of claim 11 wherein the predefined data mining algorithms comprise a tree classification algorithm.

17. The method of claim 11 wherein the predefined data mining algorithms comprise a neural classification algorithm.

18. The method of claim 11 wherein the predefined data mining algorithms comprise an associations algorithm.

19. The method of claim 1 wherein the domain-specific application operates under a first computer operating system and populating input data schema further comprises executing a software program that operates under the first computer operating system.

20. The method of claim 1 wherein the domain-specific application operates under a first computer operating system and populating input data schema further comprises executing a software program that operates under a second computer operating system.

21. The method of claim 1 wherein the domain-specific application comprises a software program capable of populating input data schema and populating input data schema further comprises executing from within the domain-specific analytic application the software program capable of populating input data schema.

22. The method of claim 1 wherein the input data from the input data schema in production scoring further comprises production data.

23. The method of claim 1 wherein the input data from the input data schema in production scoring further comprises historical data.

24. A system for automated data mining using a domain-specific analytic application for solving predefined problems, the system comprising:

means for populating input data schema, the input data schema having a format appropriate to solution of a predefined problem;

means for production training a predefined data mining model to produce a trained data mining model, the predefined data mining model comprising a predefined data mining model definition;

means for production scoring input data from the input data schema; and means for scheduling populating input data schema, production training, and production scoring.

25. The system of claim 24 wherein means for populating input data schema further comprises means for reading input data from a data store and means for writing the input data to the input data schema.

26. The system of claim 25 wherein the data store comprises historical data and means for populating input data schema further comprises means for populating input data schema with historical data.

27. The system of claim 25 wherein the data store comprises production data and means for populating input data schema further comprises means for populating input data schema with production data.

28. The system of claim 24 wherein:

means for production training has an input comprising the input data stored in the input data schema and an output comprising a knowledge base, means for production training further comprises means for executing a preselected data mining algorithm in production training mode, means for executing the data mining algorithm in production training mode comprises means for executing a software process within the analytic application, and the trained data mining model comprises the predefined data mining model definition and the knowledge base.

29. The system of claim 24 wherein means for production scoring further comprises:

means for applying the trained data mining model by executing the data mining algorithm in production scoring mode, wherein:

the data mining algorithm executed in production scoring mode comprises a software process within the analytic application, and means for executing the data mining algorithm has an output comprising production scored data.

30. The system of claim 29 further comprising means for storing the production scored data in a store of production data.

31. The system of claim 24 wherein means for scheduling populating input data schema, production training, and production scoring further comprises:
   means for storing a schedule in computer memory; and
   means for executing the steps of populating input data schema, production training, and production scoring in dependence upon the schedule.

32. The system of claim 31 wherein means for storing a schedule further comprises means for storing the schedule in a cron table for a scheduler comprising a Unix daemon called "cron."

33. The system of claim 31 wherein means for storing a schedule further comprises means for storing the schedule in an IBM DB2 Warehouse Center scheduling table for a scheduler comprising an IBM DB2 Warehouse Center scheduling facility.

34. The system of claim 33 wherein the predefined data mining algorithms comprise a radial basis function algorithm for value prediction and the production scored data comprises a prediction field containing a value calculated by means for executing the data mining algorithm in scoring mode.

35. The system of claim 33 wherein the predefined data mining algorithms comprise a neural value prediction algorithm.

36. The system of claim 33 wherein the predefined data mining algorithms comprise a demographic clustering algorithm.

37. The system of claim 33 wherein the predefined data mining algorithms comprise a neural clustering algorithm.

38. The system of claim 33 wherein the predefined data mining algorithms comprise a tree classification algorithm.

39. The system of claim 33 wherein the predefined data mining algorithms comprise a neural classification algorithm.

40. The system of claim 33 wherein the predefined data mining algorithms comprise an associations algorithm.

41. The system of claim 24 wherein the analytic application comprises:
   the predefined problems to be solved, the predefined problems having referents defined in a specific computational domain;
   predefined data mining algorithms capable of using input data read from predefined input data schema for solving the predefined problems;
   predefined data schema appropriate for solution of the predefined problems, the predefined data schema further comprising the input data schema and output data schema; and
   at least one predefined data mining model definition, the predefined data mining model definition dependent upon the predefined data schema.

42. The system of claim 24 wherein the domain-specific application operates under a first computer operating system and means for populating input data schema further comprises means for executing a software program that operates under the first computer operating system.

43. The system of claim 24 wherein the domain-specific application operates under a first computer operating system and means for populating input data schema further comprises means for executing a software program that operates under a second computer operating system.

44. The system of claim 24 wherein the domain-specific application comprises a software program capable of populating input data schema and means for populating input data schema further comprises means for executing from within the domain-specific analytic application the software program capable of populating input data schema.

45. The system of claim 24 wherein the input data from the input data schema in production scoring further comprises production data.

46. The system of claim 24 wherein the input data from the input data schema in production scoring further comprises historical data.

47. A computer program product for automated data mining using a domain-specific analytic application for solving predefined problems, the computer program product comprising:
   a recording medium;
   means, recorded on the recording medium, for populating input data schema, the input data schema having a format appropriate to solution of a predefined problem;
   means, recorded on the recording medium, for production training a predefined data mining model to produce a trained data mining model, the predefined data mining model comprising a predefined data mining model definition;
   means, recorded on the recording medium, for production scoring input data from the input data schema; and
   means, recorded on the recording medium, for scheduling populating input data schema, production training, and production scoring.

48. The computer program product of claim 47 wherein means for populating input data schema further comprises means, recorded on the recording medium, for reading input data from a data store and means, recorded on the recording medium, for writing the input data to the input data schema.

49. The computer program product of claim 48 wherein the data store comprises historical data and means for populating input data schema further comprises means, recorded on the recording medium, for populating input data schema with historical data.

50. The computer program product of claim 48 wherein the data store comprises production data and means for populating input data schema further comprises means, recorded on the recording medium, for populating input data schema with production data.

51. The computer program product of claim 47 wherein:
   means for production training has an input comprising the input data stored in the input data schema and an output comprising a knowledge base,
   means for production training further comprises means, recorded on the recording medium, for executing a preselected data mining algorithm in production training mode,
   means for executing the data mining algorithm in production training mode comprises means, recorded on the recording medium, for executing a software process within the analytic application, and
   the trained data mining model comprises the predefined data mining model definition and the knowledge base.

52. The computer program product of claim 47 wherein means for production scoring further comprises:
   means, recorded on the recording medium, for applying the trained data mining model by executing the data mining algorithm in production scoring mode, wherein:
      the data mining algorithm executed in production scoring mode comprises a software process within the analytic application, and means for executing the data mining algorithm has an output comprising production scored data.

53. The computer program product of claim 52 further comprising means, recorded on the recording medium, for storing the production scored data in a store of production data.

54. The computer program product of claim 47 wherein means for scheduling populating input data schema, production training, and production scoring further comprises:
   means, recorded on the recording medium, for storing a schedule in computer memory; and
   means, recorded on the recording medium, for executing the steps of populating input data schema, production training, and production scoring in dependence upon the schedule.

55. The computer program product of claim 54 wherein means for storing a schedule further comprises means, recorded on the recording medium, for storing the schedule in a cron table for a scheduler comprising a Unix daemon called "cron."

56. The computer program product of claim 54 wherein means for storing a schedule further comprises means, recorded on the recording medium, for storing the schedule in an IBM DB2 Warehouse Center scheduling table for a scheduler comprising an IBM DB2 Warehouse Center scheduling facility.

57. The computer program product of claim 47 wherein the analytic application comprises:
   the predefined problems to be solved, the predefined problems having referents defined in a specific computational domain;
   predefined data mining algorithms capable of using input data read from predefined input data schema for solving the predefined problems;
   predefined data schema appropriate for solution of the predefined problems, the predefined data schema further comprising the input data schema and output data schema; and
   at least one predefined data mining model definition, the predefined data mining model definition dependent upon the predefined data schema.

58. The computer program product of claim 57 wherein the predefined data mining algorithms comprise a radial basis function algorithm for value prediction and the production scored data comprises a prediction field containing a value calculated by means, recorded on the recording medium, for executing the data mining algorithm in scoring mode.

59. The computer program product of claim 57 wherein the predefined data mining algorithms comprise a neural value prediction algorithm.

60. The computer program product of claim 57 wherein the predefined data mining algorithms comprise a demographic clustering algorithm.

61. The computer program product of claim 57 wherein the predefined data mining algorithms comprise a neural clustering algorithm.

62. The computer program product of claim 57 wherein the predefined data mining algorithms comprise a tree classification algorithm.

63. The computer program product of claim 57 wherein the predefined data mining algorithms comprise a neural classification algorithm.

64. The computer program product of claim 57 wherein the predefined data mining algorithms comprise an associations algorithm.

65. The computer program product of claim 47 wherein the domain-specific application operates under a first computer operating system and means for populating input data schema further comprises means, recorded on the recording medium, for executing a software program that operates under the first computer operating system.

66. The computer program product of claim 47 wherein the domain-specific application operates under a first computer operating system and means for populating input data schema further comprises means, recorded on the recording medium, for executing a software program that operates under a second computer operating system.

67. The computer program product of claim 47 wherein the domain-specific application comprises a software program capable of populating input data schema and means for populating input data schema further comprises means, recorded on the recording medium, for executing from within the domain-specific analytic application the software program capable of populating input data schema.

68. The computer program product of claim 47 wherein the input data from the input data schema in production scoring further comprises production data.

69. The computer program product of claim 47 wherein the input data from the input data schema in production scoring further comprises historical data.

* * * * *